(12) United States Patent
Chao et al.

(10) Patent No.: US 11,461,178 B2
(45) Date of Patent: Oct. 4, 2022

(54) SYSTEM AND METHOD TO PREVENT ENDLESS MACHINE CHECK ERROR OF PERSISTENT MEMORY DEVICES

(71) Applicant: DELL PRODUCTS, LP, Round Rock, TX (US)

(72) Inventors: Ching-Lung Chao, Austin, TX (US); Shih-Hao Wang, New Taipei (TW); Hsin-Chieh Wang, Taoyuan (TW); Hung-Tah Wei, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 730 days.

(21) Appl. No.: 16/413,392

(22) Filed: May 15, 2019

(65) Prior Publication Data

US 2020/0364120 A1 Nov. 19, 2020

(51) Int. Cl.
*G06F 11/14* (2006.01)
*G06F 11/22* (2006.01)

(52) U.S. Cl.
CPC ...... *G06F 11/1417* (2013.01); *G06F 11/2284* (2013.01); *G06F 2201/85* (2013.01)

(58) Field of Classification Search
CPC ............. G06F 11/1417; G06F 11/2284; G06F 2201/85
USPC ........................................................ 713/1, 2
See application file for complete search history.

(56) References Cited

U.S. PATENT DOCUMENTS

| 7,370,234 | B2 * | 5/2008 | Stakutis | G06F 11/1417 |
| | | | | 714/E11.133 |
| 7,945,815 | B2 | 5/2011 | Khatri et al. | |
| 7,962,739 | B2 * | 6/2011 | Childs | G06F 11/1417 |
| | | | | 713/1 |
| 8,726,087 | B2 * | 5/2014 | Shibata | G06F 11/1417 |
| | | | | 714/36 |
| 2019/0026202 | A1 | 1/2019 | Chalfant et al. | |
| 2019/0026239 | A1 | 1/2019 | Chalfant et al. | |
| 2020/0218599 | A1 * | 7/2020 | Elliott | G06F 3/0679 |

* cited by examiner

*Primary Examiner* — Joseph R Kudirka
(74) *Attorney, Agent, or Firm* — Larson Newman, LLP

(57) ABSTRACT

An information handling system includes a plurality of persistent memory devices and a basic input/output system (BIOS). The BIOS begins a power-on self-test (POST) of the information handling system. During the POST, the BIOS may call a block input/output (I/O) driver to access a memory region within the first persistent memory device. The access of the memory region within the first persistent memory device is to determine whether the first persistent memory device is a bootable persistent memory device. The BIOS may determine whether blocks of the memory region contain bad memory locations. In response to the memory region containing bad memory locations, the BIOS may return a device error message without performing the access of the blocks of the memory region within the first persistent memory device and may boot to an operating system of the information handling system via another bootable device.

20 Claims, 6 Drawing Sheets

SYSTEM AND METHOD TO PREVENT ENDLESS MACHINE CHECK ERROR OF PERSISTENT MEMORY DEVICES

FIELD OF THE DISCLOSURE

The present disclosure generally relates to information handling systems, and more particularly relates to preventing endless machine check error of persistent memory devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a plurality of persistent memory devices having first and second persistent memory devices, and a basic input/output system (BIOS). The BIOS begins a power-on self-test (POST) of the information handling system. During the POST, the BIOS calls a block input/output (I/O) driver to access a memory region within the first persistent memory device. The access of the memory region within the first persistent memory device is to determine whether the first persistent memory device is a bootable persistent memory device. The BIOS determines whether blocks of the memory region within the first persistent memory device contain bad memory locations. In response to the memory region within the first persistent memory device containing bad memory locations, the BIOS returns a device error message without performing the access of the blocks of the memory region within the first persistent memory device, such that a machine check error does not happen. The BIOS boots to an operating system of the information handling system via another bootable device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
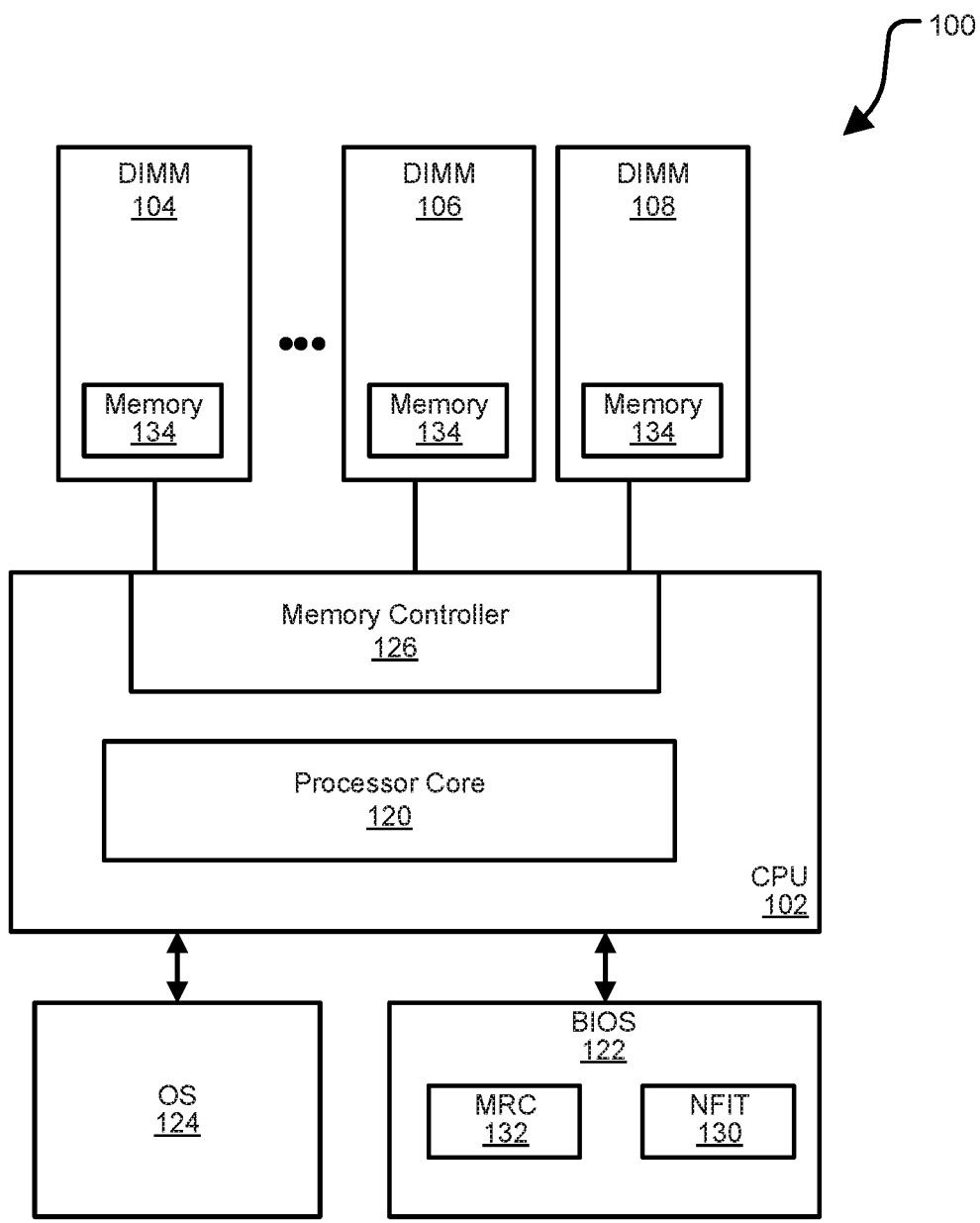
FIG. 1 is a block diagram of a portion of an information handling system according to at least one embodiment of the disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system to prevent a machine check error when attempting to boot an operating system (OS) from a bootable persistent memory device with bad memory locations within the bootable image is disclosed herein. The information handling system includes persistent memory devices having first and second persistent memory devices, and a basic input/output system (BIOS). The BIOS begins a power-on self-test (POST) of the information handling system. During the POST, the BIOS calls a block input/output (I/O) driver to access a memory region within the first persistent memory device. The access of the memory region within the first persistent memory device is to determine whether the first persistent memory device is a bootable persistent memory device. The BIOS determines whether blocks of the memory region within the first persistent memory device contain bad memory locations. In response to the memory region within the first persistent memory device containing bad memory locations, the BIOS returns a device error message without performing the access of the blocks of the memory region within the first persistent memory device, such that a machine check error does not happen. The BIOS boots to the OS of the information handling system via another bootable device.

The information handling system disclosed herein to prevent a machine check error when attempting to boot an OS from a bootable persistent memory device with bad memory locations within the bootable image provides various advantages and benefits over other systems attempting to boot the OS from a persistent memory with bad memory locations. In particular, during a UEFI boot process of the information handling system, a block input/output (I/O)

driver may retrieve a bad memory location list, which may be utilized to identify memory locations of one or more persistent memory devices that include poisoned data. In an example, the memory locations with poisoned data may be identified as uncorrectable memory locations within the bad memory location list. In an embodiment, a partition driver may request that the block I/O driver access blocks within a memory region of a bootable persistent memory device. The block I/O driver may retrieve the bad memory location list and determine whether the requested blocks within the memory region contain bad memory locations.

Based on the requested blocks within the memory region containing bad memory locations, the block I/O driver does not perform the access of the requested blocks. Instead, the block I/O driver returns a device error message, and the boot operations for the information handling system may continue to another bootable device, such as another persistent memory device of the information handling system. In certain examples, based on the comparison of the requested blocks to the bad memory locations list being performed prior to the requested blocks being accessed, the I/O block driver may prevent poisoned data in the bad memory locations from being consumed, such that a machine check error does not happen in the information handling system. Thus, the information handling system is not hung in the boot process. These operations are an improvement over conventional information handling systems implementing a partition driver that always accesses a first few blocks on a persistent memory device in an attempt to boot to an OS from the persistent memory. In these conventional information handling systems, if the bad memory locations are within the first few blocks of the persistent memory device, a machine check error would occur, such that the information handling system would be hung in the POST. Thus, the information handling system disclosed herein provides the benefit of preventing access of a bad memory location, such that a machine check error does not happen and the information handling may continue the boot process with another bootable device.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The information handling system 100 includes a CPU or processor 102 and dual in-line memory modules (DIMMs) 104, 106, and 108. In an embodiment, information handling system 100 may include additional components, not shown in or discussed with reference to FIG. 1, without varying from the scope of this disclosure. In an embodiment, the information handling system 100 can be a server, a personal computer, a laptop computer, or the like. The CPU 102 includes a processor core 120 and a memory controller 126. In an embodiment, CPU 102 may include additional components, not shown in or discussed with reference to FIG. 1, without varying from the scope of this disclosure. CPU 102 may execute a basic input/output system (BIOS) 122, and upon completion of the BIOS 122 may execute an operating system (OS) 124. BIOS 122 is firmware utilized during a boot process, such as a power-on self-test (POST), to initialize the hardware components within information handling system 100. In an embodiment, the hardware components within information handling system 100 initialized by BIOS 122 may include, but are not limited to, CPU 102 and DIMMs 104, 106, and 108. BIOS 122 may also provide runtime services for the OS 124 and other programs with CPU 102. BIOS 122 may include a non-volatile dual in-line memory module (NVDIMM) firmware interface table (NFIT) 130, and memory reference code (MRC) 132. In an embodiment, NFIT 130 can store information including, but not limited to, persistent memory ranges and properties for DIMMs 104, 106, and 108.

DIMMS 104, 106, and 108 may include one or more types of memory 134 accessible by CPU 102. For example, DIMMs 104, 106, and 108 may include dynamic random access memory (DRAM) and flash memory storage. In an embodiment, DIMMs 104, 106, and 108 may be implemented as one or more types of regular DIMMs with only volatile memory, or one or more types of non-volatile DIMMs (NVDIMMs). In an example, one or more types of NVDIMMs may include: NVDIMM-F including only persistent memory, such as flash storage, NVDIMM-N including both flash storage and DRAM on the same memory module, NVDIMM-P including persistent DRAM, and NVDIMM-X including NAND flash storage and DRAM on the same memory module. In this embodiment, DIMMs 104, 106, 108 may be Apache Pass (AEP) devices with memory 134 configured according to one of the memory types stated above, such as NVDIMM-F. One of ordinary skill in the art will recognize that while FIG. 1 illustrates DIMMs 104, 106, and 108, this disclosure is not limited to three DIMMs but can be applied to any number of DIMMs, as indicated by the ellipses in between DIMMs 104 and 106. In an embodiment, one or more of DIMMs 104, 106, and 108 may include additional components, not shown in or discussed with reference to FIG. 1, without varying from the scope of this disclosure.

CPU 102 may operate to provide data processing functionality of information handling system 100, such as is typically associated with an information handling system. As such, CPU 102 represents a data processing apparatus, such as one or more processor cores, and the associated data input and output (I/O) functionality, such as a chipset component, and other I/O processor components. CPU 102 operates to execute machine-executable code to perform the data processing tasks associated with information handling system 100.

BIOS 122 can be referred to as a firmware image, and the term BIOS is herein used interchangeably with the term firmware image, or simply firmware. BIOS 122 includes instructions executable by CPU 102 to initialize and test the hardware components of system 100, and to load a boot loader or OS 124 from a mass storage device. BIOS 122 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an example, the BIOS 122 can be substantially compliant with one or more revisions of the unified extensible firmware interface (UEFI) specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having configurable firmware.

Memory controller 126 represents a portion of a processor complex that is dedicated to the management of the data storage and retrieval from the memory devices of information handling system 100, and information handling system 100 may include one or more additional memory controllers similar to the memory controller 126, as needed or desired. Memory controller 126 may reside on a system printed circuit board, may be integrated into an I/O processor component, may be integrated with a processor on a system-on-a-chip (SoC), or may be implemented in another way, as needed or desired. Memory controller 126 operates to provide data and control interfaces to one or more DIMMs, such as DIMMs 104, 106, and 108, in accordance with a particular memory architecture. For example, memory controller 126 and the DIMMs 104, 106, and 108 may operate in accordance with a Double-Data Rate (DDR) standard, such as a JEDEC DDR4 or DDR5 standard.

In certain examples, before any usable memory 134 within DIMMs 104, 106, and 108 may be accessed by OS 124, BIOS 122 may perform a POST for information handling system 100. During the POST, BIOS 122 execute MRC 132 to access information associated with DIMMs 104, 106, and 108 and configure a memory address decode register for DIMMs 104, 106, and 108 as will be described herein. In an embodiment, the information associated with DIMMs 104, 106, and 108 stored within the memory address decode register may include, but is not limited to, a mode of operation for DIMMs 104, 106, and 108, and a total amount of memory for DIMMs 104, 106, and 108. The mode of operation can be an application-direct mode, a memory mode, a storage mode, or the like. In the application-direct mode, applications executed by processor core 120 via OS 124 can directly access data stored within DIMMs 104, 106, and 108. In the memory mode, a DRAM portion of DIMMs 104, 106, and 108 can be accessed by processor core 120 of CPU 102 to store data in DIMMs 104, 106, and 108. In the storage mode, data can be accessed in DIMMs 104, 106, and 108 in a block data format. These modes of operation can be set as attributes for DIMMs 104, 106, and 108 by the OS 124, by UEFI environment of BIOS 122, or the like. After the memory address decode register has been configured for DIMMs 104, 106, and 108 and other operations of POST have been completed, BIOS 122 may exit POST and processor core 120 may perform one or more runtime operations of OS 124.

Figure 2:
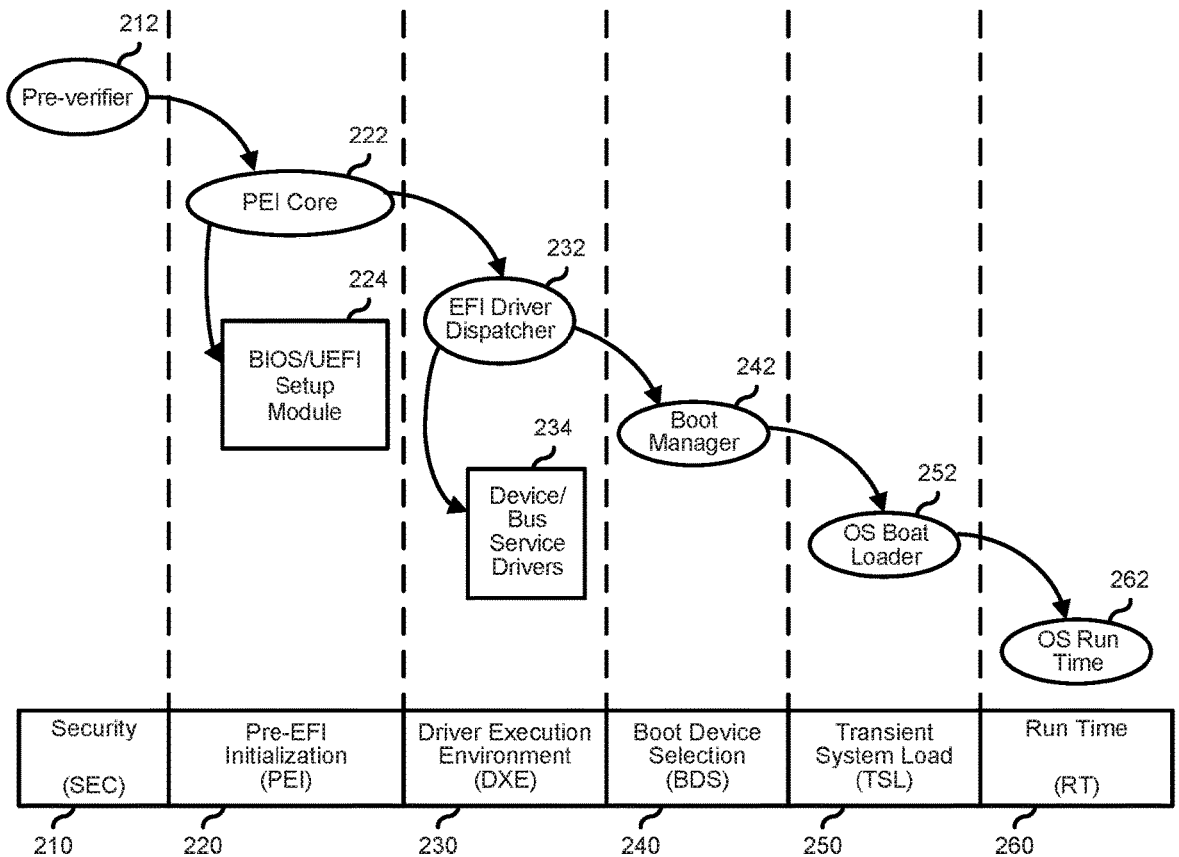
FIG. 2 is a phase diagram for a UEFI boot of the information handling system according to at least one embodiment of the disclosure.

FIG. 2 illustrates a phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, a run time phase (RT) 260, and an afterlife phase (AL) 270. SEC 210 is the first phase of a UEFI boot process on the information handling system that operates to set up a pre-verifier 212. Pre-verifier 212 handles all restart events on the information handling system, and temporarily allocates a portion of memory for use during the other boot phases. SEC 220 is executed out of the firmware resident on the information handling system, such as BIOS 152, and so serves as a root of trust for the system. SEC 210 passes execution to PEI 220 which initializes the system memory for the information handling system. PEI 220 includes CPU initialization 224, chipset initialization 226, and board resource initialization 228.

PEI 220 passes execution to DXE 230 which performs device specific initializations for the information handling system. In particular, DXE 230 executes an EFI driver dispatcher 232 that operates to load device, bus, and service drivers 234. For example, EFI driver dispatcher 232 may load drivers including, but not limited to, an address range scrubbing (ARS) driver 332 of FIG. 3, a block input/output (I/O) driver 334 of FIG. 3, and a partition driver 336 of FIG. 3. DXE 230 passes execution to BDS 240 executes a boot manager 242 which identifies a boot target, and passes execution to TSL 250. TSL 250 launches an OS boot loader 252 which loads the operating system, and passes execution to the operating system 262 at RT 260.

Techniques disclosed herein are typically implemented during DXE 230, and utilize services provided by the UEFI specification, such as boot services. UEFI applications, including OS loaders, must use boot services functions to access devices and allocate memory. Services are defined by interface functions that may be used by code running in the UEFI environment. Such code may include protocols that manage device access or extend platform capability, as well as applications running in the pre-boot environment, and OS loaders. During boot, system resources are owned by the firmware and are controlled through boot services interface functions. All boot services functionality is available until an OS loader loads enough of its own environment to take control of the system's continued operation and then terminates boot services with a call to ExitBootServices( ).

One class of boot services includes protocol handler services, such as LoadImage, StartImage, InstallProtocolInterface, RegisterProtocolNotify, LocateProtocol, and numerous others. A protocol consists of a 128-bit globally unique identifier (GUID) and a Protocol Interface structure. The structure contains the functions and instance data that are used to access a device. The functions that make up Protocol Handler Services allow applications to install a protocol on a handle, identify the handles that support a given protocol, determine whether a handle supports a given protocol, and the like. LoadImage loads an image, such as a device driver, into system memory. StartImage transfers control to a loaded image's entry point. InstallProtocolInterface installs a protocol interface on a device handle. A driver can install multiple protocols. RegisterProtocolNotify registers an event that is to be signaled whenever an interface is installed for a specified protocol. LocateProtocol returns an array of handles that support a specified protocol. During DXE 230, boot services and runtime services can be started and a UEFI boot manager can load UEFI drivers and UEFI applications in an order defined by the global NVRAM variables. Driver initialization includes identifying a driver image that is stored on some type of media, such as at NVRAM 330 of FIG. 3. While the techniques disclosed herein are typically implemented during DXE 230 and BDS 240, in another embodiment, these techniques can be implemented using UEFI system management services.

Figure 3:
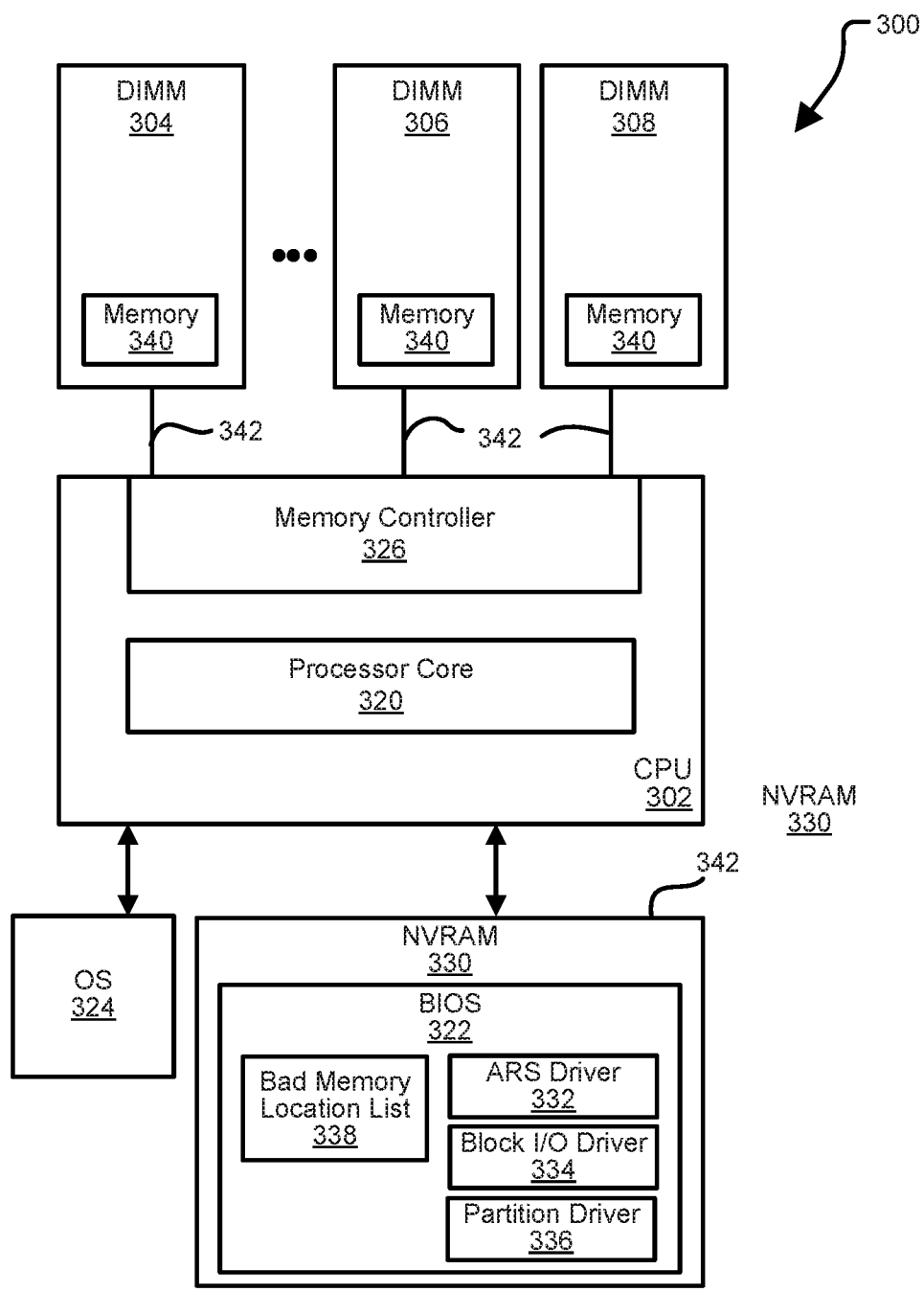
FIG. 3 is a block diagram of another portion of an information handling system according to at least one embodiment of the disclosure.

FIG. 3 illustrates a portion of an information handling system 300 including a CPU 302 and dual in-line memory modules (DIMMs) 304, 306, and 308 (DIMMs 304-308). In an embodiment, information handling system 300 can be a server, a personal computer, a laptop computer, or the like, such as or substantially similar to information handling system 100 of FIG. 1. CPU 302 includes a processor core 320 and a memory controller 326. CPU 302 is in communication with a non-volatile random access memory (NVRAM) 330, which in turn may store a BIOS 322. CPU 302 may execute BIOS 322, and upon completion of the BIOS 322 may execute an OS 324. Each of DIMMs 304-308 includes memory 340. In an example, the BIOS 122 can be substantially compliant with one or more revisions of the UEFI specification. NVRAM 330 stores data and drivers associated with BIOS 322 including, but not limited to, an address scrubbing range (ARS) driver 332, a block input/output (I/O) driver 334, a partition driver 336, and a bad memory location list 338. In certain examples, information handling system 300 may include additional or fewer components, not shown in or discussed with reference to FIG. 3, without varying from the scope of this disclosure. For example, FIG. 3 illustrates DIMMs 304-308 installed within information handling system 300. However, depending on an implementation of information handling system 300, less or more DIMMs, such as 1 to 6 DIMMs, may be installed within information handling system 300 without varying from the scope of this disclosure.

In an example, CPU 302 may separately communicate with each of the DIMMs 304-308 via one or more communication buses 342. In an embodiment, each communication bus 342, shown between CPU 302 and DIMM 304, 306, 308, or 310, may represent one or more different communication buses including, but not limited to, a System Management Bus (SMBus) and a Peripheral Component Interconnect (PCI).

During a boot process, such as DXE phase 230 of a UEFI boot process, the ARS driver 332 may perform one or more operations to check memory 340 of each of the DIMMs 304-308. During check, ARS driver 332 may determine whether one or more blocks of memory 340 are bad memory locations. In an example, if the detected bad memory locations cannot be corrected, ARS driver 332 may identify the bad memory locations as uncorrectable (UNC) locations and may identify data within these memory locations as poisoned data. In response to identifying UNC locations, ARS driver 332 may create a bad memory locations list 338 and store each identified bad memory location of memory 340 within DIMMs 304-308 in the bad memory locations list 338. ARS driver 332 may also publish an ARS bad list protocol to enable other drivers of the UEFI boot process to utilize bad memory location list 338.

In an embodiment, BIOS 322 may perform one or more operations to boot OS 324 of information handling system 300. In an example, during the boot process, an entry point for the block I/O driver 334 may be run. During the entry point, block I/O driver 334 may call the ARS bad list protocol and retrieve bad memory location list 338. A partition driver 336 may call block I/O driver 334 to check whether a persistent memory device, such as DIMM 304, has a bootable image within memory 340. In an example, partition driver 336 may check memory 340 of DIMM 304 by calling block I/O driver 334 to access one or more blocks within a memory region of memory 340. In an embodiment, the access of the one or more blocks may be a request to read from, write to, or flush the one or more blocks within memory 340 of DIMM 304.

In an example, when determining whether memory 340 of DIMM 304 includes a bootable image, partition driver 336 may not have access to bad memory location list 338 created by ARS driver 332, and may always request access the first few blocks of within a memory region of memory 340. In previous information handling systems, if a bad memory location within requested blocks is accessed, the poisoned data within the bad memory location may be consumed, which in turn may cause a machine check error within information handling system 300. In an example, the machine check error may cause the previous information handling system to be hung in the boot process.

In an embodiment, block I/O driver 334 may perform one or more operations to prevent the poisoned data from being consumed and prevent a machine check error from happening within information handling system 300. In an example, block I/O driver 334, implemented by BIOS 322, may determine, in any suitable manner, whether a bad memory location is within the requested blocks. For example, block I/O driver 334 may compare the requested blocks with the memory locations in bad memory location list 338 to determine whether the requested blocks of memory 340 in DIMM 304 contain bad memory locations. If one or more of the requested blocks match one or more memory locations in bad memory location list 338, block I/O driver 334 may determine that the requested blocks contain bad memory locations. However, if the requested blocks do not match the memory locations in bad memory location list 338, block I/O driver 334 may determine that the requested block do not contain bad memory locations. In response to a determination that the requested blocks contain a bad memory location, block I/O driver 334 does not perform a read of the requested blocks of memory 340 in DIMM 304. Instead, block I/O driver 334 returns a device error message, such as an EFI_DEVICE_ERROR message. In an example, block I/O driver 334 not performing the read of the requested blocks prevents the poisoned data from being consumed, and thereby prevents a machine check error from occurring in information handling system 300.

In an example, in response to a determination that the requested blocks contain a bad memory location, the boot process may continue by determining whether another persistent memory device, within information handling system 300, includes a bootable image. For example, partition driver 336 may call block I/O driver 334 to check whether another persistent memory device, such as DIMM 306, has a bootable image within memory 340. In an example, partition driver 336 may check memory 340 of DIMM 306 by calling block I/O driver 334 to access one or more blocks within a memory region of memory 340. Block I/O driver 334 may perform one or more of the operations described above to determine whether the requested blocks within memory 340 of DIMM 306 contain bad memory locations. In response to a determination that the requested blocks within memory 340 of DIMM 306 contain a bad memory location, block I/O driver 334 does not perform a read of the requested blocks of memory 340 in DIMM 306. Instead, block I/O driver 334 returns a device error message, such as an EFI_DEVICE_ERROR message.

In an embodiment, these operations may be performed for each persistent memory device until a boot image without any bad memory locations is located by partition device 336 and block I/O driver 334. In response to a determination that the requested blocks within a memory 340 of a persistent memory device, such as DIMM 308, does not contain any bad memory locations, OS 324 may be boot via the boot image within that memory. Thus, drivers within the UEFI pre-boot environment of information handling system 300 may prevent access to bad memory locations within persistent memory devices, and thereby prevent an occurrence of a machine check error during boot operations within information handling system 300.

During runtime, OS 324 may utilize any persistent memory devices, such as DIMMs 304 and 306, with bad memory locations within memory 340 as regular persistent memory storage devices. In an example, OS 324 may call an advanced configuration and power interface (ACPI) persistent memory standard root distributed shared memory (DSM) address range scrubbing (ARS) query function to retrieve the bad memory location list 338. OS 338 may utilize bad memory location list 338 to determine the memory locations within memory 340 of these persistent memory devices, such as DIMMs 304 and 306, not to utilize while storing data. In certain examples, OS 324 may not utilize the bad memory locations by not accessing these memory locations, via reading, writing, or flushing these memory locations.

Figure 4:
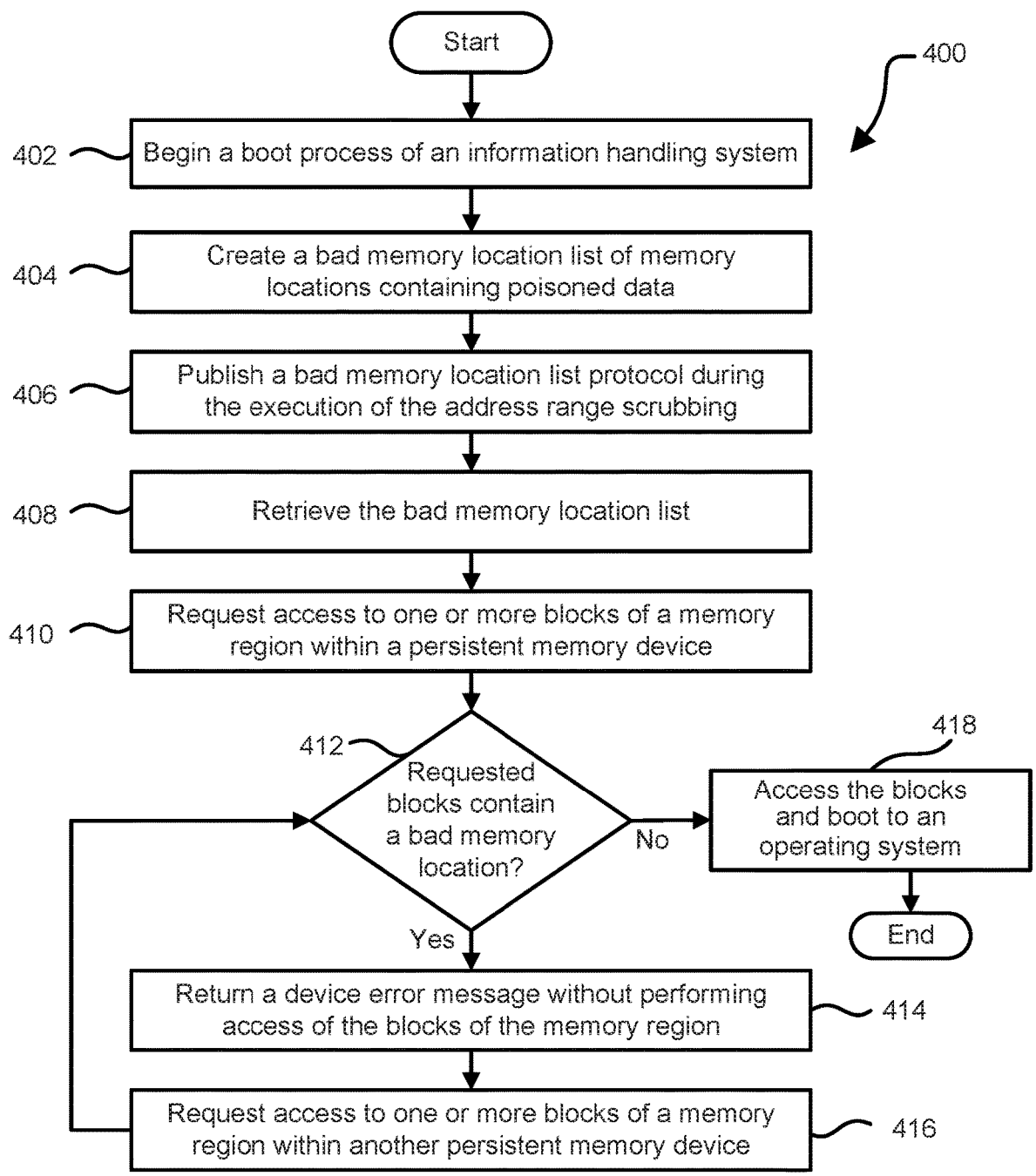
FIG. 4 is a flow diagram of a method for booting to an operating system from a persistent memory device according to at least one embodiment of the disclosure.

FIG. 4 is a flow diagram of a method 400 for booting to an operating system from a persistent memory device according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 400 of FIG. 4 may be executed during a UEFI boot process, such as during a Boot Device Selection (BDS) of the UEFI boot process, to prevent a machine check error when attempting to boot an operating system from a bootable persistent memory device with bad memory locations within the bootable image. Method 400 may be performed during a UEFI Driver Initialization routine. For example, a driver image can be loaded and started using the UEFI boot services LoadImage and StartImage.

At block 402, a boot process of an information handling system is begun. Block 402 may be performed in a manner described above. In an example, the boot process may performed by a basic input/output system (BIOS). In certain examples, the BIOS can be substantially compliant with one or more revisions of the unified extensible firmware interface (UEFI) specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images.

At block 404, a bad memory location list of memory locations containing poisoned data is created. Block 404 may be performed in a manner described above. In an example, an address range scrubbing driver may create the bad memory location list during a driver execution environment (DXE) phase of the UEFI boot operations.

At block 406, a bad memory location list protocol is published. Block 406 may be performed in a manner described above. In an example, the bad memory location list protocol may be compatible with the UEFI specification, such that one or more drivers may call the bad memory location list protocol.

At block 408, the bad memory location list is retrieved. Block 408 may be performed in a manner described above. In an example, a block input/output (I/O) driver may call the bad memory location list protocol to retrieve the bad memory location list. The bad memory location list protocol may enable the block I/O driver query the address range scrubbing driver for the bad memory location list.

At block 410, access to one or blocks of a memory region within a persistent memory device is requested. Block 410 may be performed in a manner described above. A partition driver may provide the request for the blocks to the block I/O driver. In an example, the request for access to the blocks may be a request to read, write, or flush the requested blocks.

At block 412, a determination is made whether the requested blocks contain a bad memory location. Block 412 may be performed in a manner described above. In an example, the block I/O driver may compare the requested blocks to the memory locations in the bad memory locations list to determine whether the requested blocks contain a bad memory location.

In response to the requested blocks containing a bad memory location, a device error message is returned without access of the requested block being performed at block 414. Block 414 may be performed in a manner described above. In an example, the device error message may be any suitable message, such as an EFI_DEVICE_ERROR message.

At block 416, access to one or blocks of a memory region within another persistent memory device is requested. Block 416 may be performed in a manner described above. The flow made continue as stated above at block 412.

In response to the requested blocks not containing a bad memory location, the requested blocks are accessed and an operating system is booted at block 418. Block 418 may be performed in a manner described above. In an example, upon the OS booting, the OS will call an advanced configuration and power interface (ACPI) persistent memory standard root distributed shared memory (DSM) address range scrubbing (ARS) query function to retrieve the bad memory location list. The OS may utilize the retrieved bad memory location list to determine memory locations not to utilize while storing data in the persistent memory device.

Figure 5:
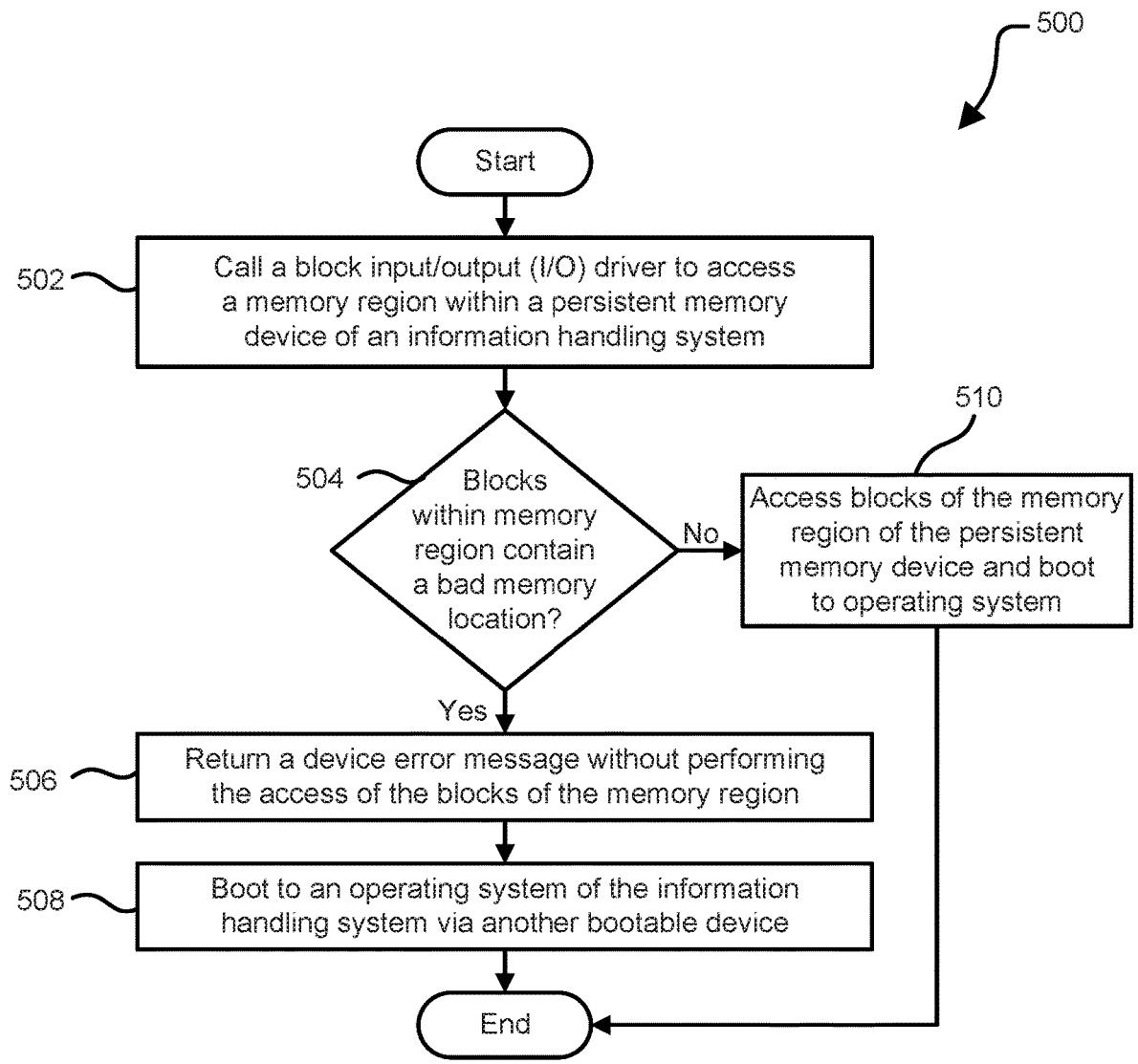
FIG. 5 is a flow diagram of another method for booting to an operating system from a persistent memory device according to at least one embodiment of the present disclosure.

FIG. 5 is a flow diagram of a method 500 for booting to an operating system from a persistent memory device according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 500 of FIG. 5 may be executed during a UEFI boot process, such as during a boot device selection (BDS) phase of the UEFI boot process, to prevent a machine check error when attempting to boot an operating system from a bootable persistent memory device with bad memory locations within the bootable image.

At block 502, a block input/output (I/O) driver is called to access a memory region within a persistent memory device of an information handling system. Block 502 may be performed in a manner described above. In an example, the access of the memory region may include, but is not limited to, reading from or writing to one or more blocks of the memory region. For example, the access may be a request to read from one or more blocks to boot an operating system (OS) of the information handling system.

At block 504, a determination is made whether blocks within the memory region contain a bad memory location. Block 504 may be performed in a manner described above. In an embodiment, this determination may be made via the block I/O driver comparing the requested blocks to a bad memory locations list. In an example, an address range scrubbing driver may create the bad memory locations list during a driver execution environment (DXE) phase of the UEFI boot process, and the block I/O driver may call a bad memory locations list protocol of the UEFI to retrieve the bad memory locations list.

In response to the requested blocks of the memory region containing by memory locations, a device error message is returned without the access of the blocks within the memory region being performed at block 506. Block 506 may be performed in a manner described above. In an example, the device error message may be an EFI_DEVICE_ERROR message. In an embodiment, poisoned data within the bad memory locations is not consumed, such that a machine check error does not happen within the information handling system. In an example, the prevention of the machine check error may allow the boot process to continue.

At block 508, an operating system of the information handling system is booted via another bootable device. Block 508 may be performed in a manner described above. In an example, the another bootable device may be another persistent memory device of the information handling system.

In response to the requested blocks of the memory region not containing bad locations, the blocks of the memory region are accessed and an operating system of the information handling system is booted at block 510. Block 510 may be performed in a manner described above.

Figure 6:
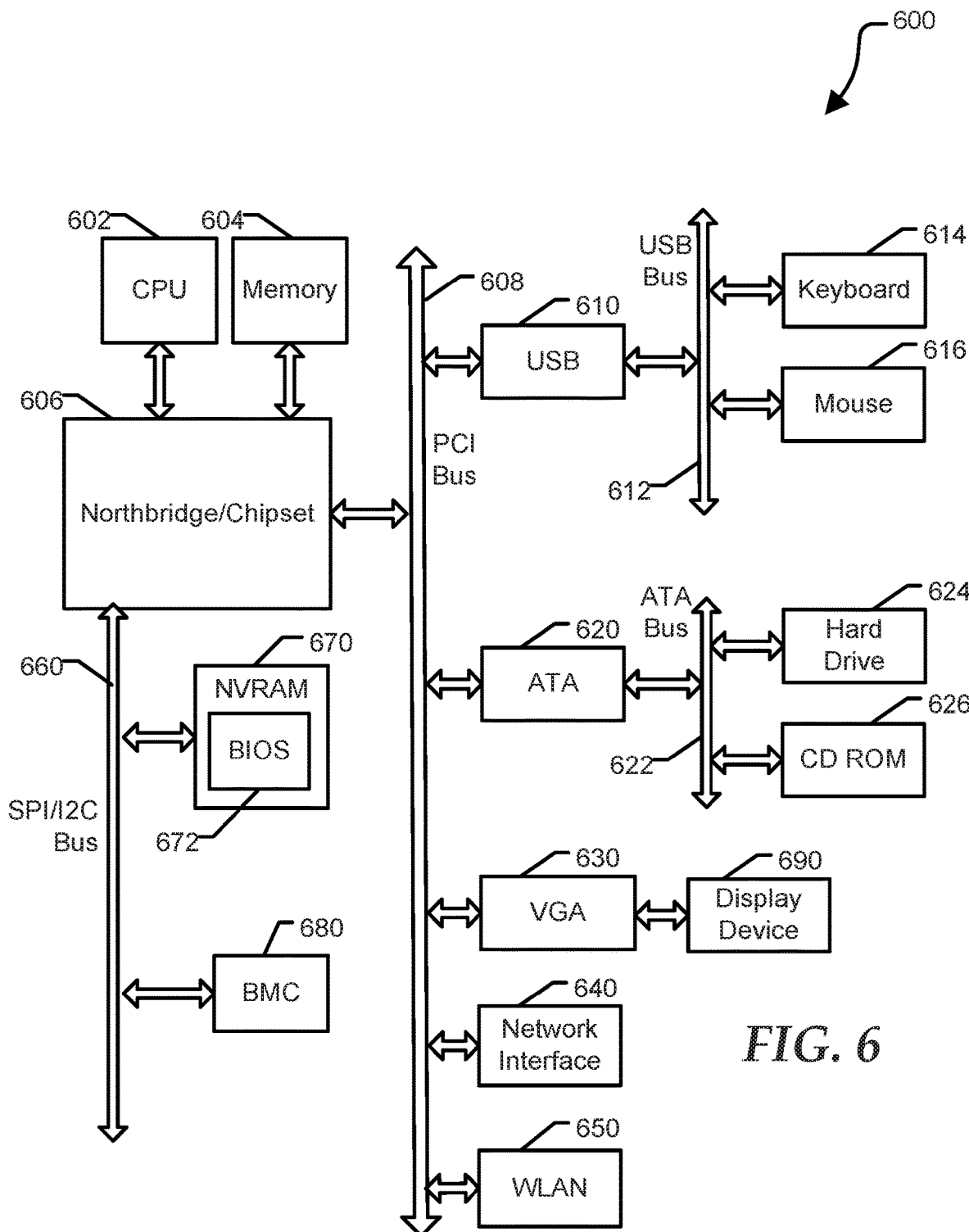
FIG. 6 is a block diagram of a general information handling system according to an embodiment of the present disclosure.

FIG. 6 illustrates a general information handling system 600 including a processor 602, a memory 604, a northbridge/chipset 606, a PCI bus 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. In an embodiment, information handling system 600 may be information handling system 100 of FIG. 1 and/or information handling system 300 of FIG. 3. BMC 680 can be referred to as a service processor or embedded controller (EC). Capabilities and functions provided by BMC 680 can vary considerably based on the type of information handling system. For example, the term baseboard management system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One or more components can be integrated together. For example, portions of northbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. For example, device controller 630 may provide data to a display device 690 to visually present the information to an individual associated with information handling system 600. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    calling, by a basic input/output system (BIOS) of an information handling system, a block input/output (I/O) driver to access a memory region within a first persistent memory device of the information handling system, wherein the access of the memory region within the first persistent memory device is to determine whether the first persistent memory device is a bootable persistent memory device;
determining, by the block I/O driver, whether blocks of the memory region within the first persistent memory device contain bad memory locations; and
in response to the memory region within the first persistent memory device containing bad memory locations:
returning a device error message without performing the access of the blocks of the memory region within the first persistent memory device, wherein not performing the access of the blocks of the memory region prevents a machine check error from occurring in the information handling system; and
booting to an operating system of the information handling system via another bootable device.

2. The method of claim 1, wherein booting to the operating system of the information handling system via the another bootable device comprises:
calling, by the BIOS, the block I/O driver to access a memory region within a second persistent memory device of the information handling system, wherein the access of the memory region within the second persistent memory device is to determine whether the first persistent memory device is a bootable persistent memory device;
determining, by the block I/O driver, whether blocks of the memory region within the second persistent memory device contain bad memory locations; and
in response to the memory region within the second persistent memory device not containing bad memory locations, booting to the operating system via the memory region of the second persistent memory device.

3. The method of claim 1, further comprising:
performing address range scrubbing of a plurality of persistent memory devices including the first persistent memory device; and
maintaining a list of uncorrectable memory locations of the persistent memory devices based on the performing of the address range scrubbing.

4. The method of claim 3, further comprising:
calling, by the operating system, a distributed shared memory to retrieve the list of uncorrectable memory locations of the persistent memory devices;
storing data within memory locations of the first persistent memory device not listed within the list of uncorrectable memory locations of the persistent memory devices.

5. The method of claim 3, wherein the determining of whether the blocks of the memory region within the first persistent memory device contain bad memory locations comprises:
retrieving, by the block I/O driver, the list of uncorrectable memory locations of the persistent memory devices; and
comparing the blocks of the memory region within the first persistent memory device to memory locations included in the list of uncorrectable memory locations of the persistent memory devices.

6. The method of claim 5, further comprising:
publishing an address range scrubbing bad list protocol including the list of uncorrectable memory locations of the persistent memory devices.

7. The method of claim 6, wherein the retrieving of the list of uncorrectable memory locations of the persistent memory devices comprises:
calling, by the block I/O driver, the address range scrubbing bad list protocol.

8. The method of claim 1, wherein the accessing of the memory region of the first persistent memory device includes reading or writing to the memory region of the first persistent memory device.

9. An information handling system comprising:
a plurality of persistent memory devices including first and second persistent memory devices; and
a basic input/output system (BIOS) that during a power-on self-test (POST) of the information handling system: calls a block input/output (I/O) driver to access a memory region within the first persistent memory device, wherein the access of the memory region within the first persistent memory device is to determine whether the first persistent memory device is a bootable persistent memory device; determines whether blocks of the memory region within the first persistent memory device contain bad memory locations; and in response to the memory region within the first persistent memory device containing bad memory locations, returns a device error message without performing the access of the blocks of the memory region within the first persistent memory device, wherein not performing the access of the blocks of the memory region prevents a machine check error from occurring in the information handling system, and boots to an operating system of the information handling system via another bootable device.

10. The information handling system of claim 9, wherein during the boot to the operating system of the information handling system via the another bootable device, the BIOS further: calls the block I/O driver to access a memory region within the second persistent memory device, wherein the access of the memory region within the second persistent memory device is to determine whether the first persistent memory device is a bootable persistent memory device; determines whether blocks of the memory region within the second persistent memory device contain bad memory locations; and in response to the memory region within the second persistent memory device not containing bad memory locations, boots to the operating system via the memory region of the second persistent memory device.

11. The information handling system of claim 10, the BIOS further performs address range scrubbing of a plurality of persistent memory devices including the first persistent memory device, and maintains a list of uncorrectable memory locations of the persistent memory devices based on the performance of the address range scrubbing.

12. The information handling system of claim 11, further comprising:
an operating system that calls a distributed shared memory to retrieve the list of uncorrectable memory locations of the persistent memory devices, and stores data within memory locations of the first persistent memory device not listed within the list of uncorrectable memory locations of the persistent memory devices.

13. The information handling system of claim 11, wherein the determination of whether the blocks of the memory region within the first persistent memory device contain bad memory locations comprises:
the BIOS further retrieves the list of uncorrectable memory locations of the persistent memory devices, and compares the blocks of the memory region within the first persistent memory device to memory locations included in the list of uncorrectable memory locations of the persistent memory devices.

14. The information handling system of claim 13, the BIOS further publishes an address range scrubbing bad list protocol including the list of uncorrectable memory locations of the persistent memory devices.

15. The information handling system of claim 14, wherein the retrieval of the list of uncorrectable memory locations of the persistent memory devices comprises: the BIOS calls the address range scrubbing bad list protocol.

16. The information handling system of claim 9, wherein the access of the memory region of the first persistent memory device includes reading or writing to the memory region of the first persistent memory device.

17. A method comprising:
during a driver execution environment phase of a power-on self-test (POST):
performing address range scrubbing of a plurality of persistent memory devices including a first persistent memory device; and
maintaining a list of uncorrectable memory locations of the persistent memory devices based on the performing of the address range scrubbing;
calling, by a basic input/output system (BIOS) of an information handling system, a block input/output (I/O) driver to access a memory region within the first persistent memory device, wherein the access of the memory region within the first persistent memory device is to determine whether the first persistent memory device is a bootable persistent memory device;
comparing the blocks of the memory region within the first persistent memory device to memory locations included in the list of uncorrectable memory locations of the persistent memory devices;
based on the comparison, determining whether blocks of the memory region within the first persistent memory device contain bad memory locations;
in response to the memory region within the first persistent memory device not containing bad memory locations, booting to an operating system via the memory region within the first persistent memory device; and
in response to the memory region within the first persistent memory device containing bad memory locations:
returning a device error message without performing the access of the blocks of the memory region within the first persistent memory device; and
booting to the operating system of the information handling system via another bootable device.

18. The method of claim 17, further comprising:
calling, by the operating system, a distributed shared memory to retrieve the list of uncorrectable memory locations of the persistent memory devices;
storing data within memory locations of the first persistent memory device not listed within the list of uncorrectable memory locations of the persistent memory devices.

19. The method of claim 17, further comprising:
during the driver execution environment phase of the POST:
publishing an address range scrubbing bad list protocol including the list of uncorrectable memory locations of the persistent memory devices.

20. The method of claim 17, wherein the accessing of the memory region of the first persistent memory device includes reading or writing to the memory region of the first persistent memory device.

* * * * *